United States Patent [19]

Hishida

[11] Patent Number: 4,917,529
[45] Date of Patent: Apr. 17, 1990

[54] ARRANGEMENT FOR COUPLING ROTARY SHAFT WITH ROTARY MEMBER

[75] Inventor: Tadashi Hishida, Sakai, Japan

[73] Assignee: VIV Engineering Inc., Osaka, Japan

[21] Appl. No.: 353,332

[22] Filed: May 16, 1989

[51] Int. Cl.$^4$ .............................................. B25G 3/00
[52] U.S. Cl. .................................... 403/259; 403/261; 474/166
[58] Field of Search ................. 403/259, 260, 261; 474/166, 170

[56] References Cited

U.S. PATENT DOCUMENTS

| | | | |
|---|---|---|---|
| 173,126 | 2/1876 | Little | 403/261 X |
| 1,049,949 | 1/1913 | Wadleigh | 403/261 |
| 4,295,753 | 10/1981 | Luerken et al. | 403/259 X |
| 4,600,333 | 7/1986 | Rohrig et al. | 403/259 |

FOREIGN PATENT DOCUMENTS

| | | | |
|---|---|---|---|
| 2247069 | 4/1974 | Fed. Rep. of Germany | 474/166 |
| 1181179 | 1/1959 | France | 403/259 |
| 159858 | 7/1987 | Japan | 474/170 |

Primary Examiner—Andrew V. Kundrat
Attorney, Agent, or Firm—Wenderoth, Lind & Ponack

[57] ABSTRACT

An arrangement for coupling a rotary member such as a pulley of V-belt or flat belt to a rotary shaft. A boss is mounted on the rotary shaft so that the rotary shaft will have its one end protruding from the boss. The protruding end is passed through a center hole in the rotary member. A nut is tightened on the end of the rotary shaft protruding from the center hole to tighten the rotary member and the boss and thus couple them together. A plurality of projections are formed on one of the rotary member and the boss and a plurality of cutouts or holes are provided in the other. The projections are inserted in the cutouts or holes to couple the rotary member and the boss together.

4 Claims, 1 Drawing Sheet

ARRANGEMENT FOR COUPLING ROTARY SHAFT WITH ROTARY MEMBER

BACKGROUND OF THE INVENTION

The present invention relates to an arrangement for coupling a rotary shaft with a rotary member such as a V-belt pulley, a flat belt pulley and a brake drum used in a transmission for an agricultural machine or the like.

In recent years, a rotary member used to transmit relatively light loads such as a V-belt pulley or a flat belt pulley has been made by pressing a metal plate such as a steel plate. There are various known means for fixedly mounting such a thin-walled rotary member on a rotary shaft. One of them is known as projection welding in which projections are formed on a flange surface integral with a boss fixed to a rotary shaft and an electric current is passed through the projections to generate heat while pressing one side of a rotary member against the projections so that the projections will melt while being crushed, thus welding the rotary member and the rotary shaft together.

Other known methods are to apply paddings to the joint between the rotary member and the boss by use of a welding rod or to weld by use of a hard solder.

The projection welding is advantageous in that the coupling structure is simple and the welding can be done automatically with little temperature rise which might otherwise cause the rotary member to be deformed by heat. But the projection welding is unreliable because the objects are welded together only through projections having a small joint area and the welding condition tends to be influenced by the shape and size of the projections.

A fairly large bond strength may be obtained by welding by use of a welding rod or a hard solder. But in both methods, the welding area has to be heated to a high temperature. This might cause the deformation of the rotary member. Also, it is difficult to weld two different kinds of metals together with these methods.

SUMMARY OF THE INVENTION

It is an object of the present invention to provide an arrangement for precisely coupling a rotary shaft and a rotary member together which obviates the abovesaid shortcomings and which eliminates welding or brazing which are necessarily attended with heat generation.

According to the present invention, a boss is mounted on the rotary shaft so that the rotary shaft will have its end protruding from the boss. The protruding end of the rotary shaft is passed through the center hole formed in the rotary member, whereas the engaging means of the rotary member is brought into engagement with the engaging means of the boss. A torque is thus reliably transmitted between the rotary member and the rotary shaft through the boss without the necessity of welding or brazing.

The boss and the rotary member are coupled together by tightening a nut on the male thread formed on the end of the rotary shaft. The rotary member and the rotary shaft are thus coupled together firmly without the fear of the rotary member being warped by heat.

Other features and objects of the present invention will become apparent from the following description taken with reference to the accompanying drawings, in which:

DETAILED DESCRIPTION OF THE PREFERRED EMBODIMENT

Figure 1:
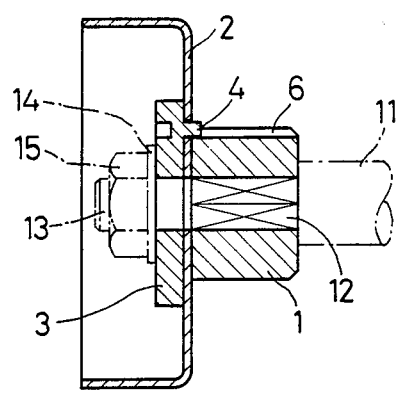
FIG. 1 is a vertical sectional side view of the first embodiment of the present invention.
Figure 2:
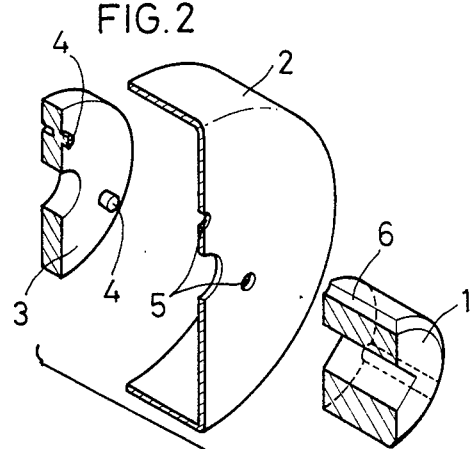
FIG. 2 is a partially cutaway exploded perspective view of the same.

FIGS. 1 and 2 show the first embodiment which comprises a boss 1 made of a hard material such as metal, a rotary member 2 made e.g. by pressing a metallic plate, and a seating plate 3 made of a hard material such as metal.

The seating plate 3 has its one side recessed at a plurality of points e.g. by pressing so that a plurality of projections 4 will be formed on the other side. The rotary member 2 is provided with a plurality of holes 5 through which the projections 4 pass.

The boss 1 is provided in its outer periphery with a plurality of cutouts 6 to receive the projections 4 protruding through the rotary member 2.

In this embodiment, the rotary shaft 11 is formed with a square end portion 12 and a round shank portion 13 at its extreme end. The rotary shaft 11 is inserted into the boss 1 until its square end portion 12 is received fully in a square hole in the boss 1 and the round shank portion 13 passes through center holes formed in the rotary member 2 and the seating plate 3. The latter abuts the rotary member 2.

When inserting the rotary shaft 11, care must be taken that the projections 4 pass through the holes 5 in the rotary member 2 and engage in the cutouts 6 in the outer periphery of the boss 1 so that the rotary member 2 is fixedly mounted on the rotary shaft 11.

Then, a nut 15 is screwed on the threaded round shank portion 13 with a washer 14 between the nut 15 and the seating plate 3 to tighten together the boss 1, the seating plate 3 and the rotary member 2 between the nut 15 and a shoulder of the rotary shaft 11.

In the first embodiment, the boss 1 coupled to the rotary shaft 11 through the engagement between the square hole in the boss 1 and the square end portions 12 of the rotary shaft 11. The rotary member 2 and the boss 1 are fixedly coupled together by the engagement between the projections 4 on the seating plate 3 and the holes 5 in the rotary member 2 as well as the cutouts 6 on the boss 1. Thus a torque is reliably transmitted between the rotary member 2 and the rotary shaft 11.

Figure 3:
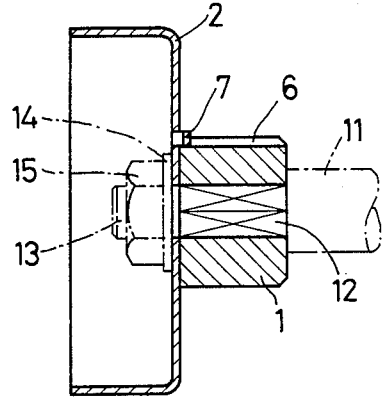
FIG. 3 is a vertical sectional side view of the second embodiment.
Figure 4:
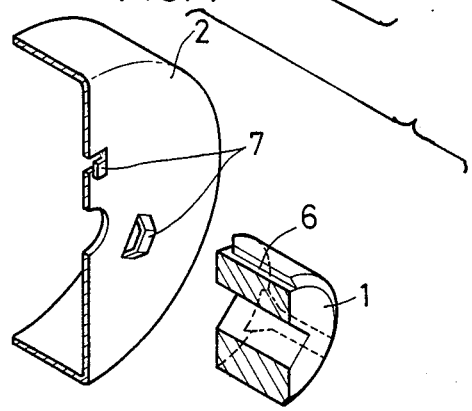
FIG. 4 is a view similar to FIG. 2 of the embodiment of FIG. 3.

FIGS. 3 and 4 show the second embodiment in which the rotary member 2 is provided with a plurality of projections 7, each of which is formed into a bridge shape by pushing out the portion between two parallel cuts in the rotary member 2. The projections 7 are engaged in the cutouts 6 in the boss 1. The nut 15 is screwed on the threaded round shank portion 13 protruding through the center hole in the rotary member 2 with the washer 14 interposed between the nut and the rotary member. The rotary member 2 is thus fixedly coupled to the rotary shaft 11 through the engagement between the projections 7 on the rotary member 2 and the cutouts 6 in the boss 1.

Figure 5:
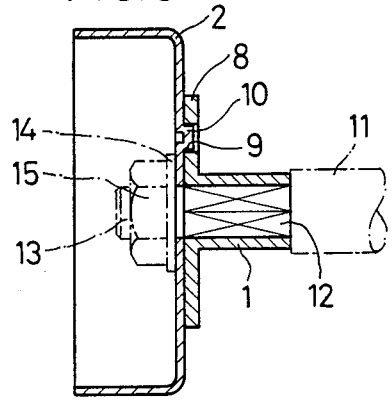
FIG. 5 is a vertical sectional side view of the third embodiment.
Figure 6:
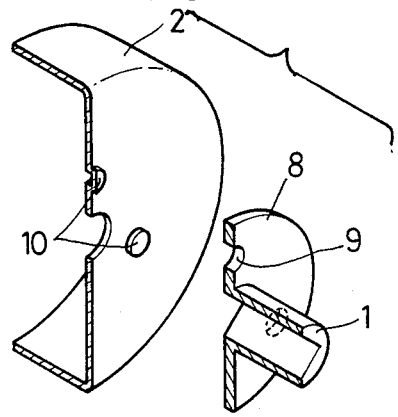
FIG. 6 is a view similar to FIG. 2 of the embodiment of FIG. 5.

FIGS. 5 and 6 show the third embodiment in which the boss 1 is integrally provided with a flange 8 provided with a plurality of holes 9. The rotary member 2 has a plurality of projections 10 made e.g. by extruding and adapted to engage in the holes 9 in the flange 8 of the boss 1.

In this embodiment, the projections 10 on the rotary member 2 are engaged in the holes 9 in the flange 8, whereas the square end portion 12 of the rotary shaft 11 is received in the square hole in the boss 1 so that the round shank portion 13 will protrude through the center hole in the rotary member 2.

Then the nut 15 is screwed on the threaded round shank portion 13 of the rotary shaft 11 with the washer 14 between the nut 15 and the rotary member 2. The rotary shaft and the rotary member are thus coupled together through the engagement between the projections 10 on the rotary member 2 and the hole 9 in the flange 8 integral with the boss 1 mounted on the rotary shaft 11.

In the second and third embodiments, no seating plate 3 is used.

In the above-described embodiments, the boss 1 is provided with cutouts 6 or holes 9, whereas the rotary member 2 is provided with projections 7 or 10 adapted to be received in the cutouts 6 and holes 9. However, alternatively the boss 1 may be provided with projections while cutouts and holes for receiving the projections can be provided in the rotary member 2. Also, the rotary shaft 11 may have formed in its end face a threaded hole so that the boss 1 and the rotary member 2 can be coupled together by screwing a bolt into the threaded hole.

What is claimed is:

1. An arrangement for coupling together a rotary shaft and a rotary member having a center hole therethrough, comprising:
    a polygonal cross-section part adjacent one end of said shaft and a protruding portion at said end of said shaft and having a threaded portion thereon;
    a boss having a polygonal cross section-hole extending axially therethrough with a cross-sectional shape complementary to the cross-sectional shape of said part of said shaft, said boss being fixedly mounted on said polygonal cross-section part of said rotary shaft with said protruding end of said rotary shaft extending through said center hole in said rotary member;
    recess means in said boss;
    engaging means on said rotary member constituted by a portion of the thickness of said rotary member deformed in a direction toward said boss and having a shape complementary to said recess means and fitting into said recess means; and
    threaded means engaged on said threaded portion and clamping said rotary member against said boss.

2. An arrangement as claimed in claim 1 in which said recess means comprises a slot in said boss extending parallel to the rotational axis of said shaft.

3. An arrangement as claimed in claim 1 in which said boss has a radially extending flange thereon and said recess means comprises an aperture in said flange.

4. An arrangement for coupling together a rotary shaft and a rotary member having a center hole therethrough, comprising:
    a polygonal cross-section part adjacent one end of said shaft and a protruding portion at said end of said shaft and having a threaded portion thereon;
    a boss having a polygonal cross section-hole extending axially therethrough with a cross-sectional shape complementary to the cross-sectional shape of said part of said shaft, said boss being fixedly mounted on said polygonal cross-section part of said rotary shaft with said protruding end of said rotary shaft extending through said center hole in said rotary member;
    recess means in said boss;
    an engaging member on said protruding portion of said rotary shaft, said engaging member having engaging means constituted by a portion of the thickness of said member deformed in a direction toward said boss and having a shape complementary to said recess means;
    said rotary member having an aperture therethrough, said engaging means projecting through said aperture and into said recess means for engaging therein; and
    threaded means engaged on said threaded portion and clamping said engaging member and said rotary member against said boss.

* * * * *